(12) United States Patent
Christman

(10) Patent No.: US 10,093,836 B2
(45) Date of Patent: Oct. 9, 2018

(54) SELF-ADHESIVE PROTECTIVE WRAP

(71) Applicant: T-VAC, INC., Gardena, CA (US)

(72) Inventor: John Christman, Gardena, CA (US)

(73) Assignee: T-VAC, INC., Gardena, CA (US)

( * ) Notice: Subject to any disclaimer, the term of this patent is extended or adjusted under 35 U.S.C. 154(b) by 355 days.

(21) Appl. No.: 14/731,681

(22) Filed: Jun. 5, 2015

(65) Prior Publication Data
US 2015/0353778 A1 Dec. 10, 2015

Related U.S. Application Data

(60) Provisional application No. 62/008,609, filed on Jun. 6, 2014.

(51) Int. Cl.
| | |
|---|---|
| B32B 3/24 | (2006.01) |
| C09J 7/04 | (2006.01) |
| B05C 3/10 | (2006.01) |
| B32B 5/02 | (2006.01) |
| B32B 15/14 | (2006.01) |
| D06M 15/71 | (2006.01) |
| C09J 7/21 | (2018.01) |
| C09J 7/20 | (2018.01) |

(52) U.S. Cl.
CPC ............... *C09J 7/048* (2013.01); *B05C 3/10* (2013.01); *B32B 5/022* (2013.01); *B32B 15/14* (2013.01); *C09J 7/205* (2018.01); *C09J 7/21* (2018.01); *D06M 15/71* (2013.01); *B32B 2260/021* (2013.01); *B32B 2260/04* (2013.01); *B32B 2260/046* (2013.01); *C09J 2201/606* (2013.01); *C09J 2400/263* (2013.01); *C09J 2423/106* (2013.01); *Y10T 428/24273* (2015.01); *Y10T 442/2254* (2015.04); *Y10T 442/2738* (2015.04); *Y10T 442/656* (2015.04)

(58) Field of Classification Search
CPC ............................ C09J 7/048; Y10T 442/2254
USPC .......................................................... 442/90
See application file for complete search history.

(56) References Cited

U.S. PATENT DOCUMENTS

| | | | | |
|---|---|---|---|---|
| 1,729,681 | A | * 10/1929 | Panthen | ................ D06M 15/17 106/279 |
| 3,953,557 | A | 4/1976 | Brax et al. | |
| 4,031,162 | A | 6/1977 | Brax et al. | |
| 4,082,829 | A | 4/1978 | Brax et al. | |
| 4,101,711 | A | 7/1978 | Stillman | |

(Continued)

FOREIGN PATENT DOCUMENTS

| | | |
|---|---|---|
| EP | 1225195 A1 | 7/2002 |
| GB | 1408177 A | 10/1975 |

(Continued)

OTHER PUBLICATIONS

Bunzl, Bunzl Clarity Waxed Bone Guard Vacuum Pouches, https://www.bunzlpd.com/product.php?productid=421363cat=0&page=1.

*Primary Examiner* — William P Watkins, III
(74) *Attorney, Agent, or Firm* — Jacob M. Ward; Ward Law Office LLC

(57) ABSTRACT

A self-adhesive wrap product includes a non-woven material layer impregnated with a wax formulation. The wax formulation has microcrystalline wax, mineral oil, polypropylene glycol, and soy oil. The self-adhesive wrap product is particularly suitable for minimizing a corrosion of metal components wrapped with the self-adhesive wrap product.

10 Claims, 4 Drawing Sheets

(56) References Cited

U.S. PATENT DOCUMENTS

| | | | |
|---|---|---|---|
| 4,537,225 A * | 8/1985 | McNulty | F16L 9/14 |
| | | | 138/145 |
| 4,777,095 A | 10/1988 | Kondo et al. | |
| 5,236,728 A | 8/1993 | Locke et al. | |
| 5,380,260 A | 1/1995 | Blott | |
| 5,554,376 A | 9/1996 | Sekiyama et al. | |
| 5,562,964 A | 10/1996 | Jones | |
| 6,579,584 B1 | 6/2003 | Compton | |
| 7,018,719 B2 | 3/2006 | Ueyama et al. | |
| 7,335,415 B1 | 2/2008 | Goux et al. | |
| 8,012,520 B2 | 9/2011 | Wofford et al. | |
| 8,522,827 B2 | 9/2013 | Lazzara et al. | |
| 2007/0014947 A1 | 1/2007 | Mengel et al. | |
| 2008/0182053 A1 | 7/2008 | Broadus et al. | |
| 2010/0129556 A1 | 5/2010 | Fung et al. | |
| 2010/0251485 A1 * | 10/2010 | Smets | C11D 3/001 |
| | | | 8/137 |
| 2011/0311388 A1 | 12/2011 | Fenger | |

FOREIGN PATENT DOCUMENTS

| | | |
|---|---|---|
| WO | WO 90/00137 A1 | 1/1990 |
| WO | 93/21967 A1 | 11/1993 |
| WO | 95/03135 A1 | 2/1995 |
| WO | 03/101719 A2 | 12/2003 |

* cited by examiner

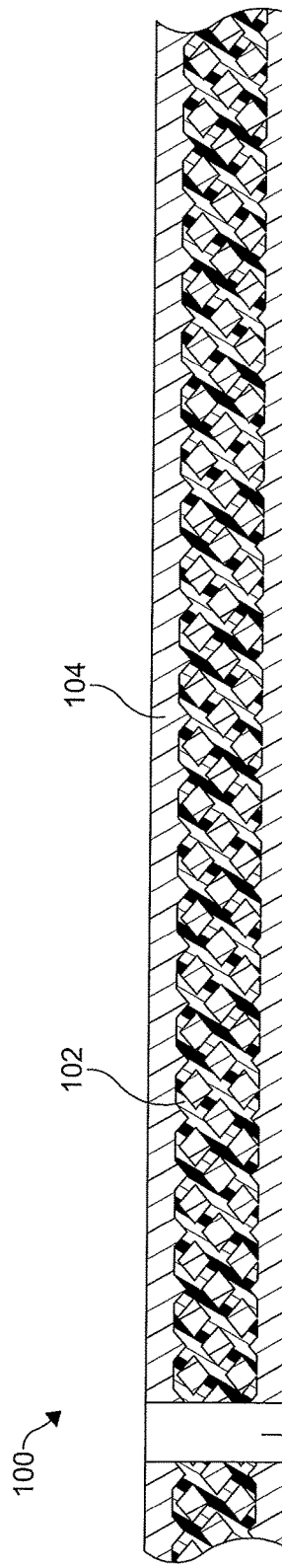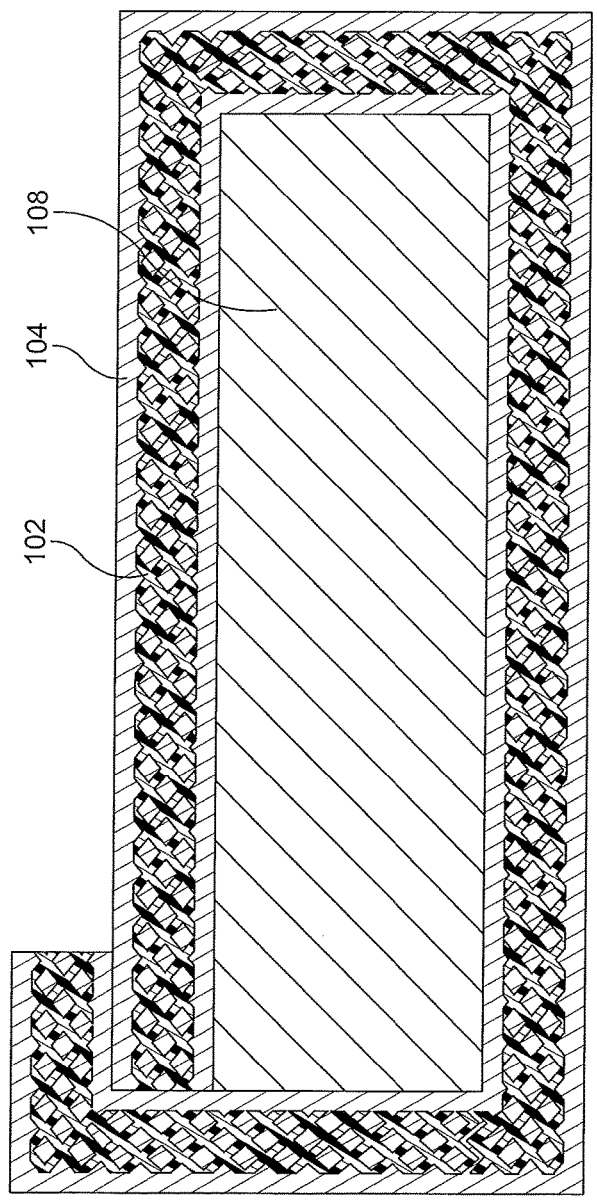

SELF-ADHESIVE PROTECTIVE WRAP

CROSS-REFERENCE TO RELATED APPLICATIONS

This application claims the benefit of U.S. Provisional Application No. 62/008,609, filed on Jun. 6, 2014. The entire disclosure of the above application is hereby incorporated herein by reference.

FIELD

The present disclosure relates to packaging materials for metal components and, more particularly, to a self-adhesive wrap for protecting metal components against corrosion.

BACKGROUND

Minimizing corrosion of metal components such as automotive parts using volatile corrosion inhibitor (VCI) products, films and bags in known in the art. In particular, VCI products are a type of corrosion inhibitor used to protect ferrous materials against corrosion, where it is impractical to otherwise apply surface treatments. The VCI products will slowly release compounds within a sealed airspace, which actively prevent surface corrosion. A typical application is to protect stored tools or parts inside containers such as bags, boxes or cupboards. One advantage of VCI products is that, once the container is opened and reclosed, levels of inhibitor in the sealed airspace of the container will recover.

Often, the known VCI products can only be used on certain types of metal components. These solutions are also generally expensive. Particular environmental conditions are also required to effectively apply VCI products, which makes such solutions difficult to implement. These solutions can also be difficult to use with large and irregularly shaped components.

There is a continuing need for a wrap product to minimize corrosion of metal components such as automotive parts during transportation and storage. Desirably, the wrap product can be used with a variety of metals, is reusable, and can be used on metal components having irregular shapes.

SUMMARY

In concordance with the instant disclosure, a wrap product to minimize corrosion of metal components such as automotive parts during transportation and storage, and which can be used with a variety of metals, is reusable, and can be used on metal components having irregular shapes, is surprisingly discovered.

The wrap product of the present disclosure is a self-adhesive protective wrap that militates against corrosion of metal components in corrosive environments. The self-adhesive wrap product can also be used as a protective shield against abrasion during shipping or transportation of metal components.

In an exemplary embodiment, the self-adhesive wrap product includes a bonded, non-woven polypropylene that is impregnated with a wax formulation. These two components together are hydrophobic, strong, flexible, and self-adhesive to all surfaces. The self-adhesive wrap product also conforms to military specifications, and is environmentally friendly in comparison to known VCI products.

The wax formulation creates a sealing barrier to outside conditions and the environment, no matter the climate or moisture content in which the self-adhesive wrap product is placed. The hydrophobic properties of the polypropylene mean that any moisture is also urged away from metal components wrapped with the wrap product. In particular, the impregnation of the wax formulation also forms both adhesive and hydrophobic wax layers on both sides of the non-woven polypropylene.

In one embodiment, a self-adhesive wrap product includes a non-woven material layer impregnated with a wax formulation. The wax formulation has microcrystalline wax, mineral oil, polypropylene glycol, and soy oil.

In another embodiment, a method for manufacturing a self-adhesive wrap product includes a step of immersing a non-woven material layer in a heated bath of a wax formulation. The wax formulation is caused to impregnate the non-woven material layer and form an impregnated non-woven material layer. The impregnated non-woven material layer is then removed from the heated bath. An excess amount of the wax formulation is next removed from outer surfaces of the impregnated non-woven material layer. The impregnated non-woven material layer is subsequently cooled, and at least one of cut and perforated to form the self-adhesive wrap product.

In a further embodiment, a system for manufacturing a self-adhesive wrap product includes a source of a non-woven material layer, a heated bath, a wax remover, a refrigerator, a cutter, and a perforator. The heated bath holds the wax formulation, and is configured to receive the non-woven material layer and form an impregnated non-woven material layer. The wax remover, for example, a squeegee, is configured to remove an excess amount of the wax formulation from outer surfaces of the impregnated non-woven material layer. The refrigerator is configured to receive impregnated non-woven material layer from the wax remover. The refrigerator cools the impregnated non-woven material layer to a desired temperature for handling. The cutter is configured to receive the impregnated non-woven material from the refrigerator, and cuts the impregnated non-woven material to a predetermined length. The perforator is configured to receive the cut impregnated non-woven material from the cutter. It perforates the cut impregnated non-woven material at predetermined locations to form the self-adhesive wrap product.

In an additional embodiment, a method for minimizing corrosion of a metal component includes wrapping at least a portion of the metal component with the self-adhesive wrap product.

DRAWINGS

The above, as well as other advantages of the present disclosure, will become readily apparent to those skilled in the art from the following detailed description, particularly when considered in the light of the drawings described hereafter, in which:

FIG. 2 is a fragmentary cross-sectional side elevational view of the self-adhesive wrap product taken along section line 2—2 in FIG. 1;

FIG. 3 is a cross-sectional side elevational view of the self-adhesive wrap product depicted in FIGS. 1, and further shown wrapped around and sealing a metal component for minimizing a corrosion thereof;

DETAILED DESCRIPTION

Figure 1:
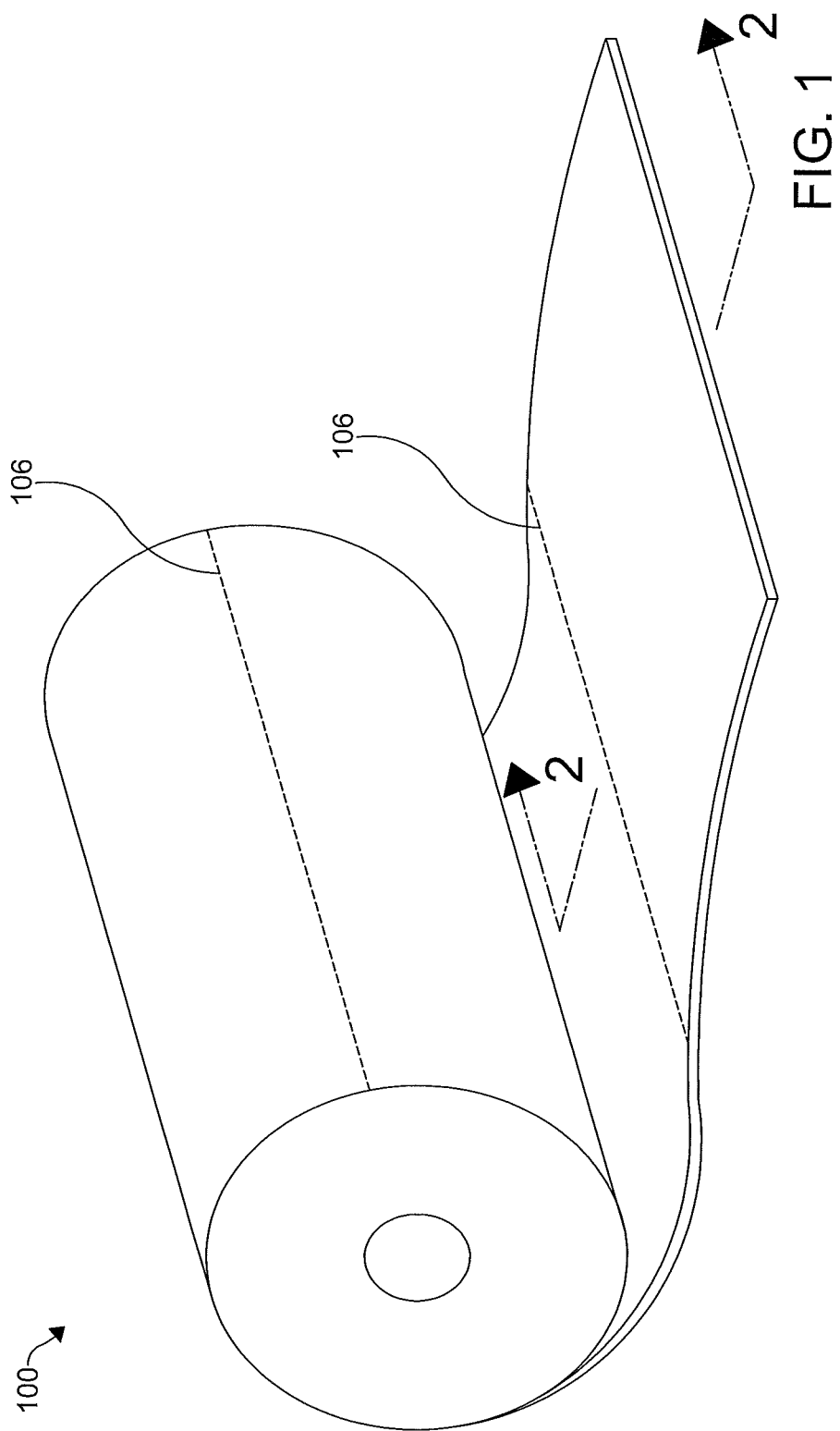
FIG. 1 is a perspective view of a self-adhesive wrap product according to one embodiment of the present disclosure, the self-adhesive wrap product provided on a roll.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical unless otherwise disclosed.

As shown in FIGS. 1-5, the present disclosure includes a self-adhesive wrap product 100 for militating against corrosion of metal components. Without limiting the scope of the invention, suitable metal components for use with the self-adhesive wrap 100 of the disclosure may advantageously include parts such as screws, bolts, pipes, beams, automobile components and housings, and other uniform or non-uniform metal pieces subject to corrosion such as oxidation or rusting.

Referring to FIG. 2, the self-adhesive wrap product 100 includes a non-woven material layer 102. The non-woven material layer 102 is a fabric-like material made from long fibers or filaments, which are entangled and bonded together by at least one of chemical, mechanical, heat or solvent treatment. The non-woven material layer 102 is hydrophobic, and has a porosity that permits an impregnation thereof with a wax formulation 104 as described further herein.

In particular embodiments, the non-woven material layer 102 is formed from synthetic fibers such a polyethylene and polypropylene, as nonlimiting examples. In a most particular embodiment, the non-woven material 102 is a point bonded, non-woven polypropylene at an area density of about 1.5 oz./sq. ft, and having the physical properties as shown in TABLE 1.

TABLE 1

| Physical Property | Minimum | Nominal | Maximum | Units | Method |
|---|---|---|---|---|---|
| Petrolatum | 171 | — | — | 25 C. | ASTM D341 |
| Tensile Strength | — | 52.3 | — | Lbs | — |
| Elongation @ Peak | — | 49% | — | — | — |
| Thickness | — | 22 +/− 5% | — | Mils | — |
| Temperature Range | −40 | — | +350 | Fahrenheit | — |

One of ordinary skill in the art may select other suitable non-woven materials, including a different porosity and thickness, for the non-woven material layer 102 as desired.

The non-woven material layer 102 is impregnated with a wax formulation 104. The wax formulation 104 is specially formulated to militate against a transfer of corrosive agents, such as liquid water or water vapor, from one side of the non-woven material layer 102 to the other side of the non-woven material layer 102. In particular embodiments, the wax formulation 104 on the non-woven material layer 102 permits a substantially fluid-tight seal to be formed by a wrapping of the self-adhesive wrap product 100 around a metal component.

In a most particular embodiment, the wax formulation 104 of the present disclosure includes microcrystalline wax, mineral oil, polypropylene glycol, and soy oil. The microcrystalline wax may be a food grade wax, for example. The microcrystalline wax adds body to the formulation 104, and behaves as a tackifying agent. The microcrystalline wax causes the self-adhesive wrap product to stick to metal components when wrapped. The microcrystalline wax may be used in an amount up to about 80% by weight relative to the total weight of the wax formulation, for example.

The mineral oil in the wax formulation 104 may also be food grade. The mineral oil reduces the wax formulation viscosity, and facilitates an even transfer or impregnation of the wax formulation 104 throughout the non-woven material layer 102. The mineral oil is also hydrophobic, and behaves as a water shielding agent. The concentration of the mineral oil in the wax formulation 104 may be up to about 8% by weight relative to the total weight of the wax formulation, for example.

The wax formulation 104 further includes polypropylene glycol in amount up to about 2% by weight relative to the total weight of the wax formulation 104. The propylene glycol may also be food grade. In particular, the polypropylene glycol acts as an agent to disperse water.

A remainder of the wax formulation 104 may include the soy oil. The soy oil of the wax formulation 104 may also be food grade. The soy oil facilitates a biodegradability of the self-adhesive wrap product 100. Soy oil is a drying oil, which means that it will slowly harden upon exposure to air, forming a flexible, transparent, and waterproof solid. The soy oil also behaves as a bonding agent, resulting in superior adhesion when the self-adhesive wrap product 100 is applied to ferrous and non-ferrous metal components.

In a most particular embodiment, the wax formulation 104 has a composition substantially as shown in TABLE 2.

TABLE 2

| Ingredient | Weight Percent |
|---|---|
| Microcrystalline wax | 80% |
| Mineral oil | 8% |
| Polypropylene glycol | 2% |
| Soy oil | 10% |

The wax formulation 104 may account for between about 50% and about 90% of the self-adhesive wrap product 100, by weight relative to the total weight of the self-adhesive wrap product 100 including the non-woven material layer 102. In a particular embodiment, the wax formulation 104 accounts for approximately 77.5% of the self-adhesive wrap product 100, by weight relative to the total weight of the self-adhesive wrap product 100 including the non-woven material layer 102. One of ordinary skill in the art may selective other relative weights for the wax formulation 104 and the non-woven material layer 102, as desired.

It should be understood that a skilled artisan may also use other suitable ingredients, as well as adjust the weight percentages of the wax formulation 104 as necessary to account for the addition of the suitable ingredients, within the scope of the present disclosure.

The self-adhesive wrap product 100 of the present disclosure may also have a predetermined pattern of perforations 106. The perforations 106 may be in the form of minor holes or slits through the self-adhesive wrap product 100, including the non-woven material layer 102 and the layers of the wax formulation 104 disposed on both sides thereof. The pattern of perforations 106 facilitates a tearing of discrete portions of the self-adhesive wrap product 100 for end use.

In operation, as shown in FIG. 3, at least a portion of a metal component 108 may be wrapped with the self-adhesive wrap product 100, as described hereinabove. The self-adhesive wrap product 100 sticks to the metal component 108, without requiring any further treatment or adhesives. The self-adhesive wrap product 100 may also stick to itself, to encapsulate and provide a substantially fluid tight seal of the metal component 108. The self-adhesive wrap product 100 thereby militates against a corrosion of the metal component 108.

Figure 4:
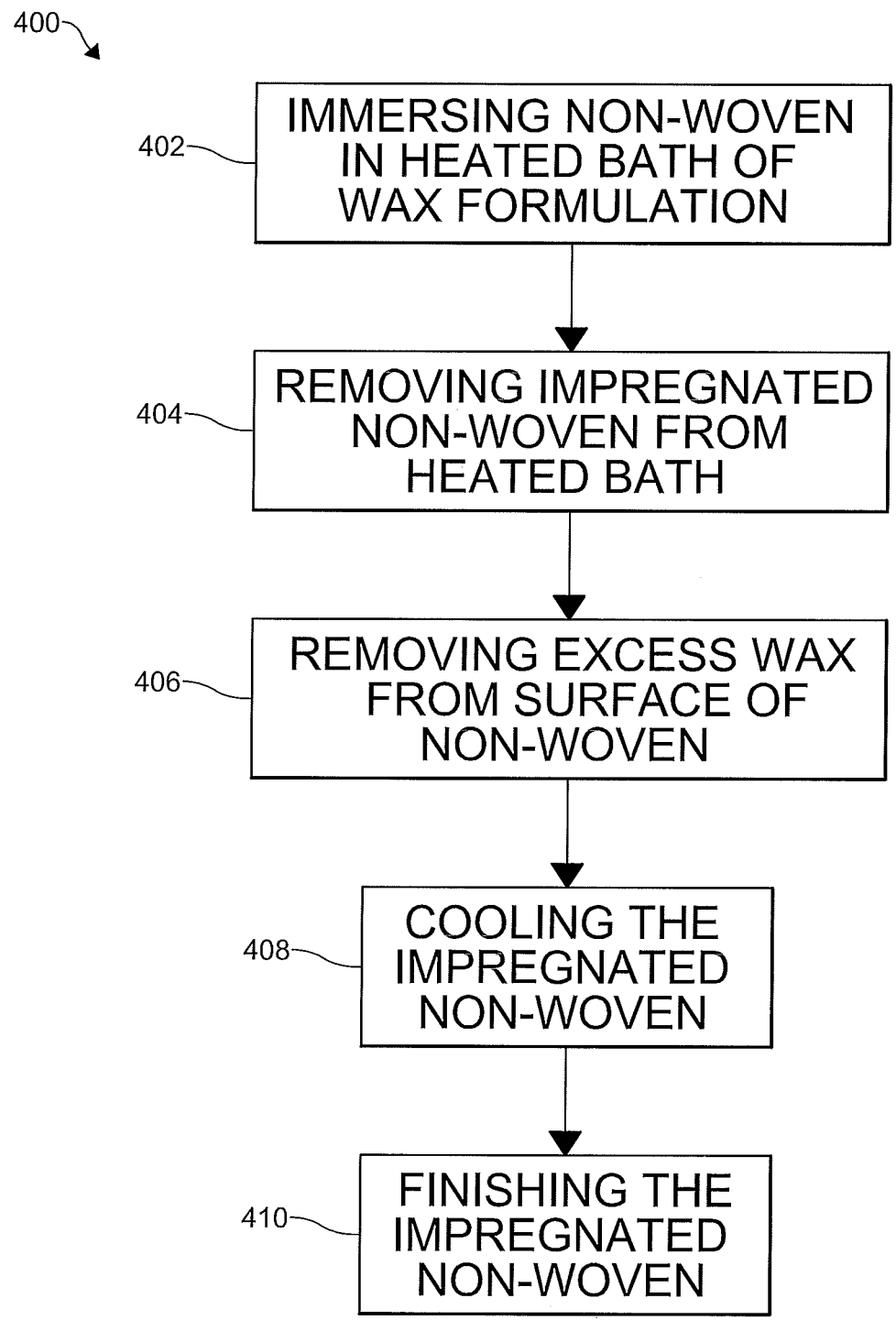
FIG. 4 is a diagram of a method for manufacturing the self-adhesive wrap product shown in FIG. 1.
Figure 5:
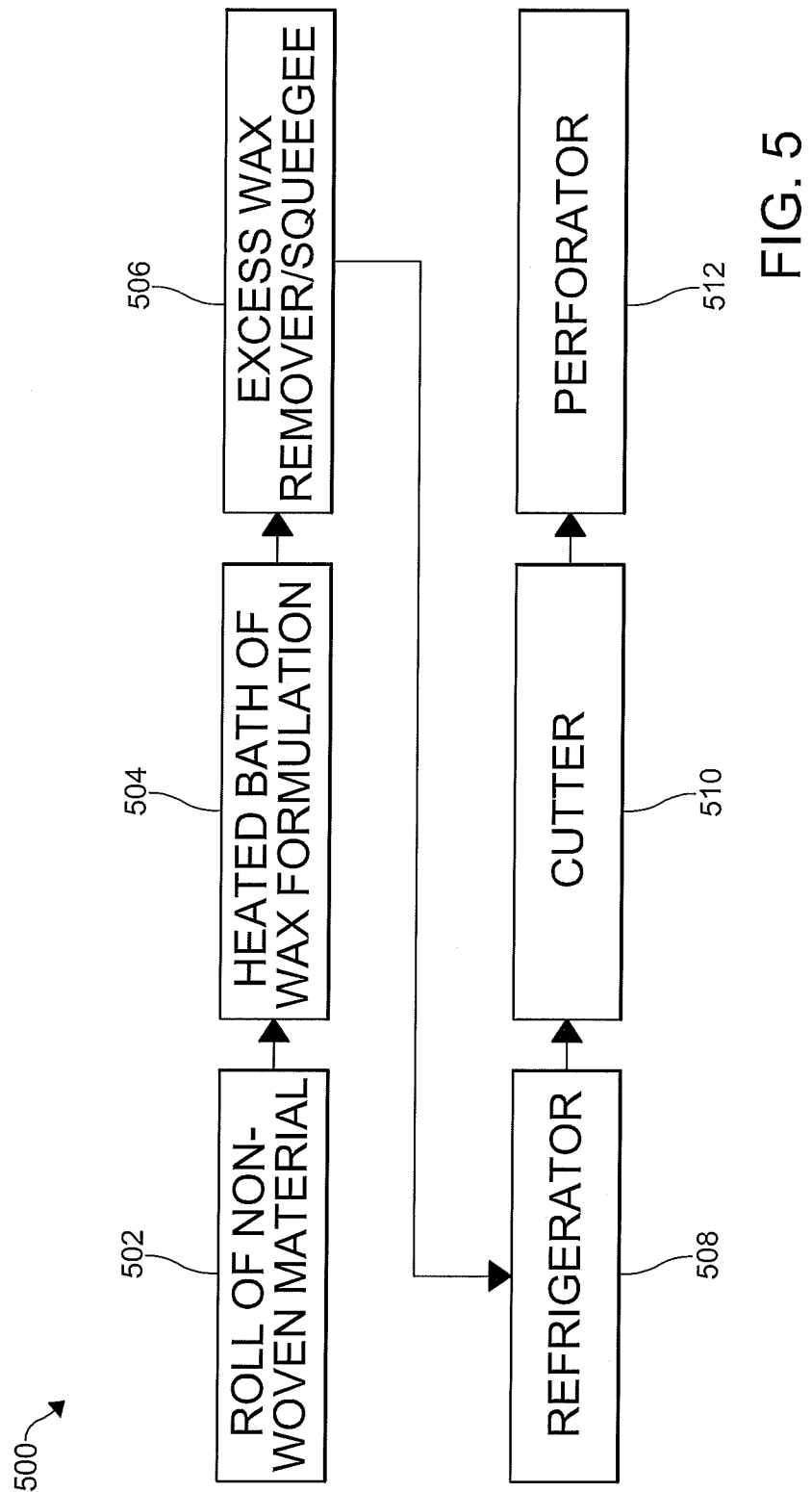
FIG. 5 is a diagram of a system for manufacturing the self-adhesive wrap product shown in FIG. 1.

The present disclosure further includes a method 400 and system 500 for manufacturing the self-adhesive wrap product 100, for example, as shown in FIGS. 4 and 5, respectively. The method 400 for manufacturing the self-adhesive wrap product 100 may be a continuous or a batch process, as desired.

The method 400 includes a step 402 of immersing the non-woven material layer 102 in a heated bath 504 of the wax formulation 104 described hereinabove. The source of the non-woven material layer 102 may be the form of a roll of material 502, and which is unrolled and pulled through the heated bath, for example. Where in the heated bath, the wax formulation 104 is caused to impregnate the non-woven material layer 102 and form an impregnated non-woven material layer. In particular, the wax formulation fills substantially all of the pores of the non-woven material layer.

The temperature of the heated bath is sufficient to lower the viscosity of the wax formulation 104 to a point that facilitates the wax impregnation process. In a particular embodiment, the temperature at which the wax formulation is maintained is about 180° F. One of ordinary skill in the art may select other suitable temperatures for the heated bath, as desired.

Following the impregnation process, the impregnated non-woven material layer is removed from the heated bath in a step 404. An excess amount of the wax formulation is then removed in a step 406 from outer surfaces of the impregnated non-woven material layer. Even with removal of excess material, it should be appreciated that a top layer and a bottom layer of wax remains on the outer surfaces of the non-woven material layer 102, for example, as shown in FIG. 2. The existence of the top and bottom layers of the wax facilitates the self-adhesion of the product 100 when wrapped on metal components 108.

In a particular embodiment, the excess amount of the wax formulation 104 may be removed with a squeegee 506. The device for removing the excess wax material may be configured to simultaneous remove excess wax from both the upper and lower surfaces of the impregnated non-woven material layer 102, for example. Other types of systems for removing the excess amount of the wax formulation are contemplated and considered within the scope of the present disclosure.

Upon removing the excess amount of the wax formulation from the surfaces of the non-woven material layer 102, the impregnated non-woven material layer 102 is cooled to a predetermined temperature in a step 408. For example, the impregnated non-woven material layer 102 may be run through a refrigerator 508 that cools the impregnated non-woven material to a temperature that facilitates a handling of the impregnated non-woven material. The predetermined temperature may be nearly room temperature, as a nonlimiting example. A skilled artisan can select any suitable temperature to which to cool the impregnated non-woven material, as desired.

Subsequent to the cooling of the impregnated non-woven material by the refrigerator, the impregnated non-woven material is then at least one of cut and perforated in a finishing step 410 to form the self-adhesive wrap product 100. Using a cutter 510, lateral cuts can be made with a knife, and the impregnated non-woven material 102 can be cut to a predetermine length.

Similarly, using a perforator 512, the impregnated non-woven material can be perforated to a predetermined length. An end user can then tear along the perforations to create a desired length for a particular application on site.

Any width of the self-adhesive wrap product 100 may be manufactured, as desired. In a particular embodiment, the self-adhesive wrap product 100 has a width of about 4.5 inches to about 36 inches. The ability to create varying widths of the self-adhesive wrap product 100 is particularly advantageous for militating against corrosion of large and irregularly shaped metal components 108.

Advantageously, the self-adhesive wrap product 100 of the present disclosure is easy to both apply and remove. This allows it to be reusable. Not only is the self-adhesive wrap product 100 a strong rust inhibitor, but it is also resistant to moisture, UV degradation, and bacterial growth. The self-adhesive wrap product 100 exhibits high dead-fold characteristics, and is therefore very conformable to both protect and cushion surfaces of metal components 108 with which it is used.

While certain representative embodiments and details have been shown for purposes of illustrating the invention, it will be apparent to those skilled in the art that various changes may be made without departing from the scope of the disclosure, which is further described in the following appended claims.

What is claimed is:

1. A self-adhesive wrap product for minimizing corrosion of metal components, comprising:
   a non-woven material layer impregnated with a wax formulation including
      microcrystalline wax present in an amount up to about 80 percent by weight relative to the total weight of the wax formulation,
      mineral oil present in an amount up to about 8 percent by weight relative to the total weight of the wax formulation,
      polypropylene glycol present in an amount up to about 2 percent by weight relative to the total weight of the wax formulation, and
      a remainder of soy oil in an amount of at least 10 percent by weight relative to the total weight of the wax formulation, wherein the soy oil slowly hardens upon exposure to air, forming a flexible, transparent, and waterproof solid, and behaves as a bonding agent to the metal components,
   wherein the wax formulation is present in an amount between about 50% and about 90% of the self-adhesive wrap product by weight relative to the total weight of the self-adhesive wrap product.

2. The self-adhesive wrap product of claim 1, wherein the non-woven material layer is a point bonded, non-woven polypropylene.

3. The self-adhesive wrap product of claim 1, wherein the non-woven material layer has an area density of about 1.5 oz./sq. ft.

4. The self-adhesive wrap product of claim 1, wherein the non-woven material layer has a thickness of about 22 mils.

5. The self-adhesive wrap product of claim 1, wherein the wax formulation is present in an amount of approximately 77.5% of the self-adhesive wrap product, by weight relative to the total weight of the self-adhesive wrap product.

6. The self-adhesive wrap product of claim 1, having a predetermined pattern of perforations disposed through the non-woven material layer.

7. The self-adhesive wrap product of claim 1, wherein the microcrystalline wax is present in the wax formulation in an amount of about 80%, the mineral oil is present in the wax formulation in an amount of about 8%, the polypropylene glycol is present in the wax formulation in an amount of about 2%, and the soy oil is present in the wax formulation in an amount of about 10%, wherein all percentages are by weight relative to the total weight of the wax formulation.

8. The self-adhesive wrap product of claim 1, wherein at least a portion of the self-adhesive wrap product is disposed around a metal component, the wax formulation contacting the metal component.

9. A self-adhesive wrap product for minimizing corrosion of metal components, consisting of:
- a non-woven material layer impregnated with a wax formulation consisting of microcrystalline wax, mineral oil, polypropylene glycol, and soy oil.

10. A self-adhesive wrap product for minimizing corrosion of metal components, comprising:
- a roll of a non-woven material layer impregnated with a wax formulation including
    - microcrystalline wax present in an amount up to about 80 percent by weight relative to the total weight of the wax formulation,
    - mineral oil present in an amount up to about 8 percent by weight relative to the total weight of the wax formulation,
    - polypropylene glycol present in an amount up to about 2 percent by weight relative to the total weight of the wax formulation, and
    - a remainder of soy oil in an amount of at least 10 percent by weight relative to the total weight of the wax formulation, wherein the soy oil slowly hardens upon exposure to air, forming a flexible, transparent, and waterproof solid, and behaves as a bonding agent to the metal components,
- wherein the wax formulation is present in an amount between about 50% and about 90% of the self-adhesive wrap product by weight relative to the total weight of the self-adhesive wrap product, and
- wherein the roll has rows of perforations extending from one side of the roll to another side of the roll, individual ones of the rows spaced apart from each other along a length of the roll, and the perforations permit for a tearing of individual sheets of the self-adhesive wrap product from the roll.

* * * * *